United States Patent Office 3,339,386
Patented Sept. 5, 1967

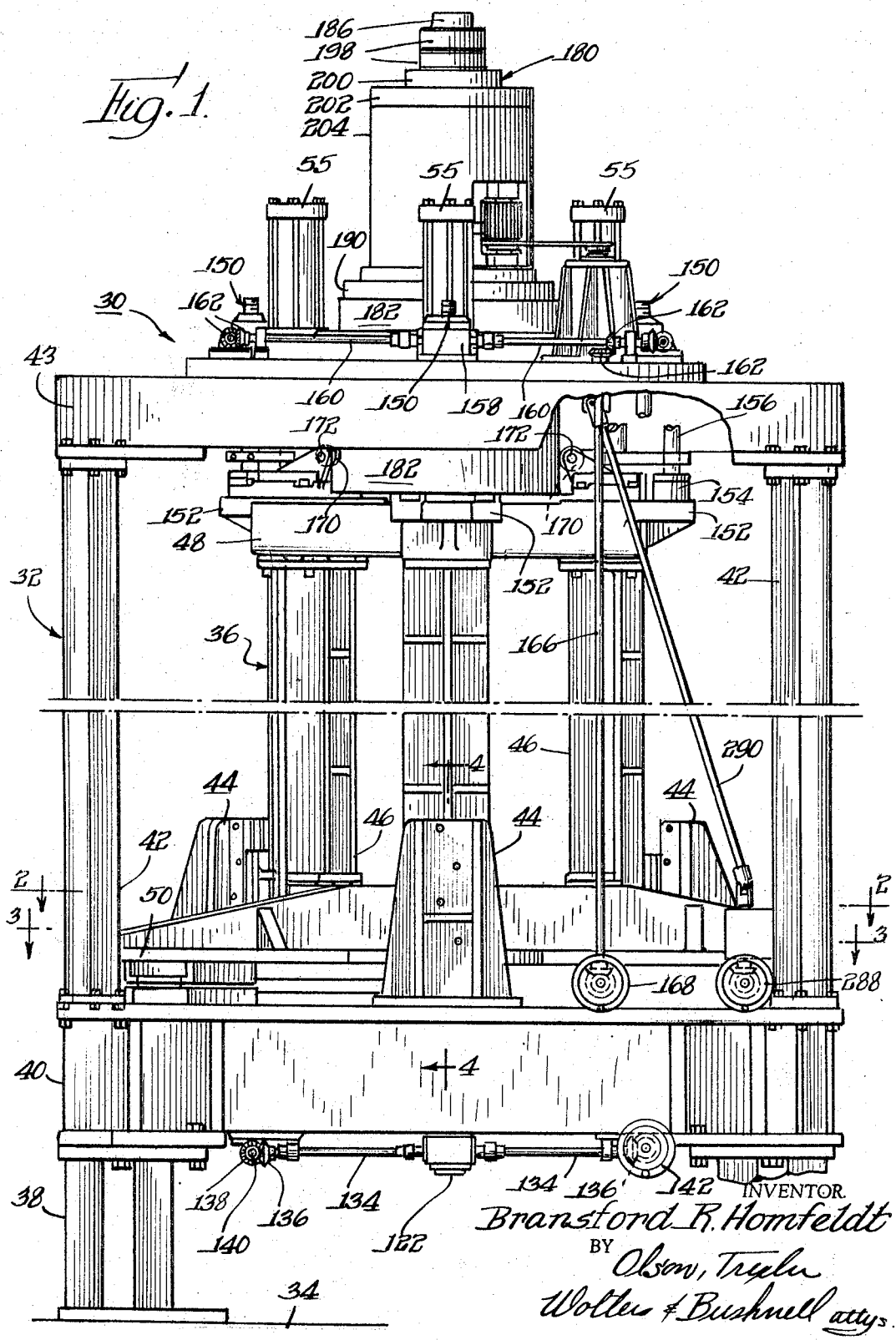

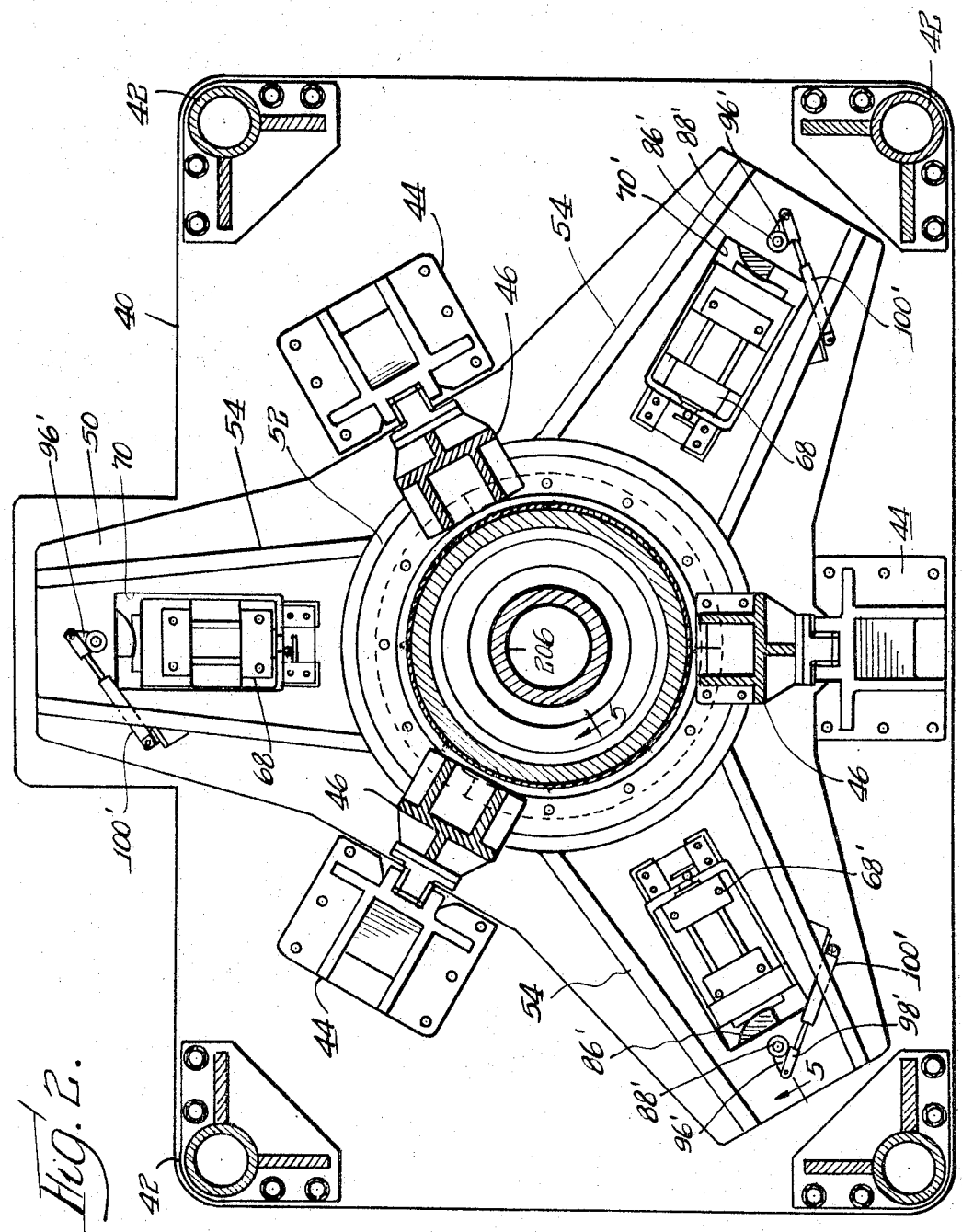

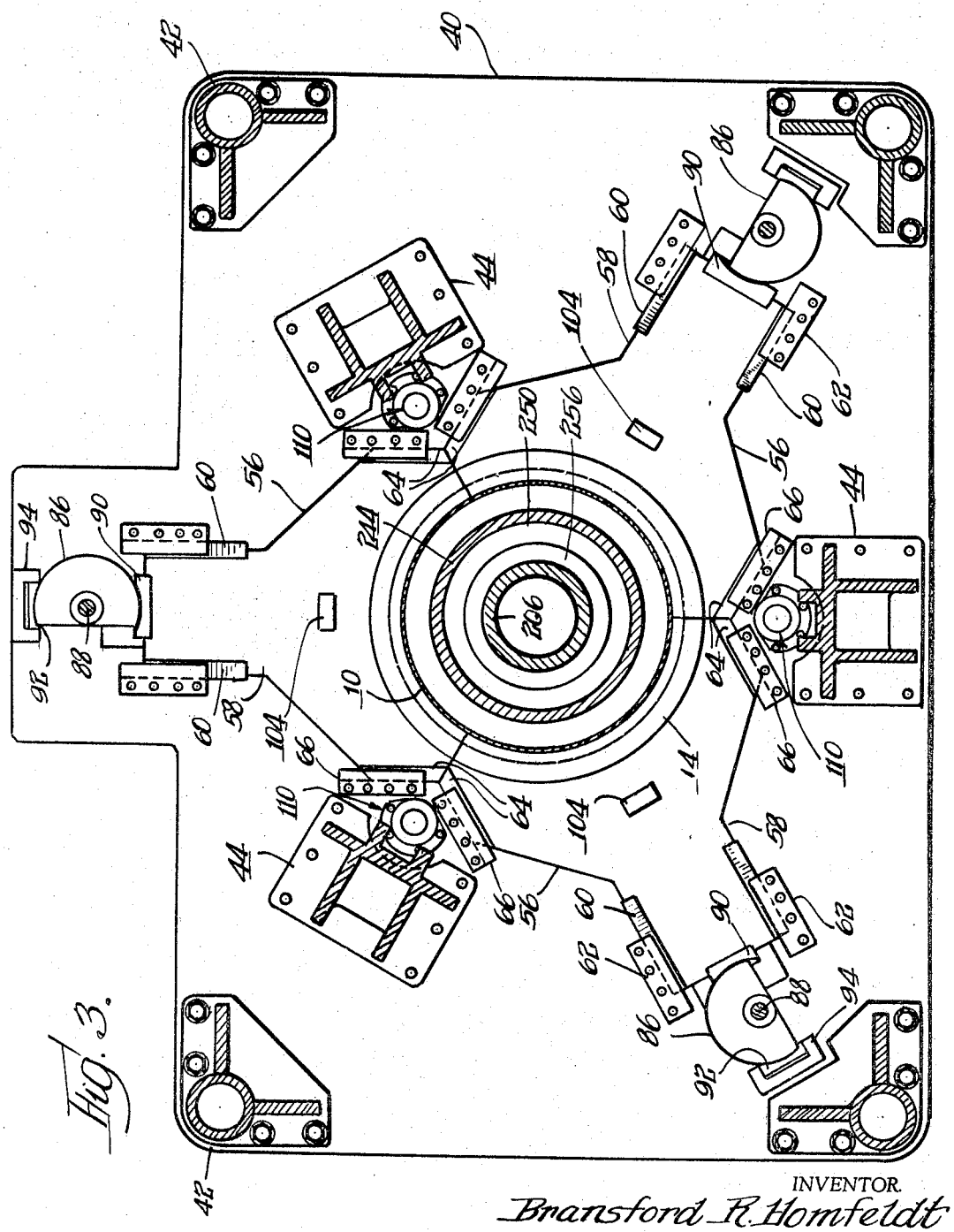

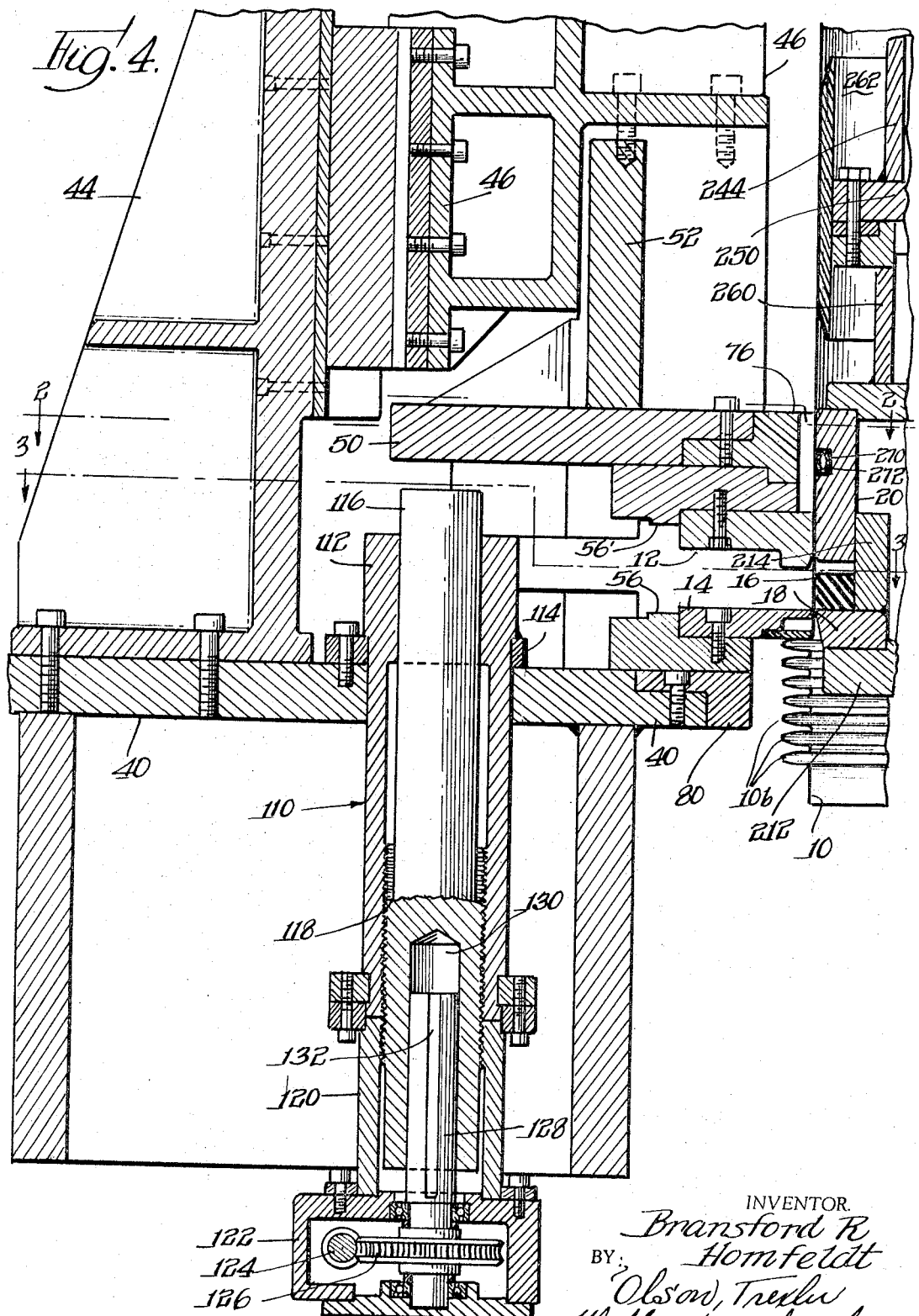

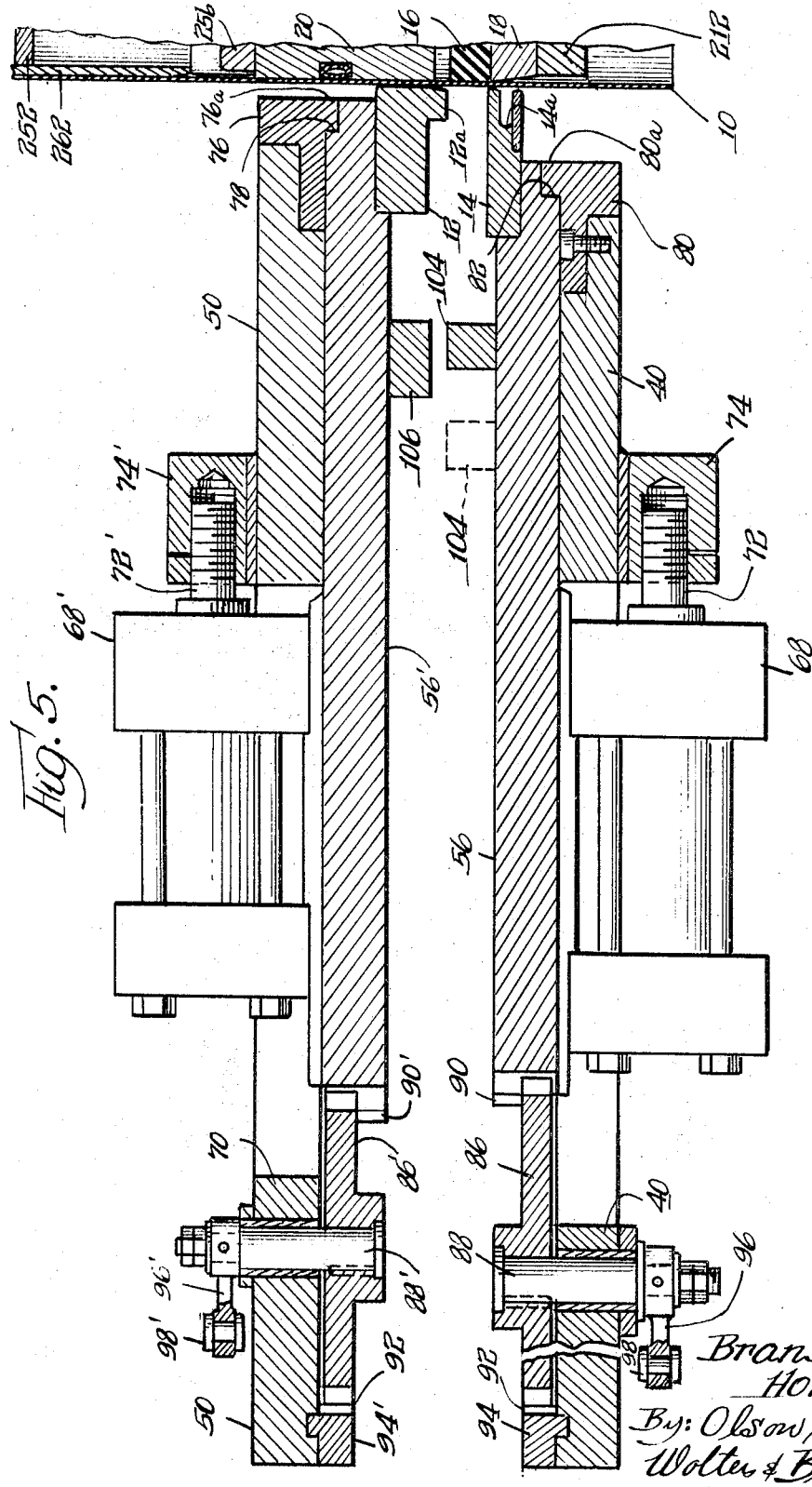

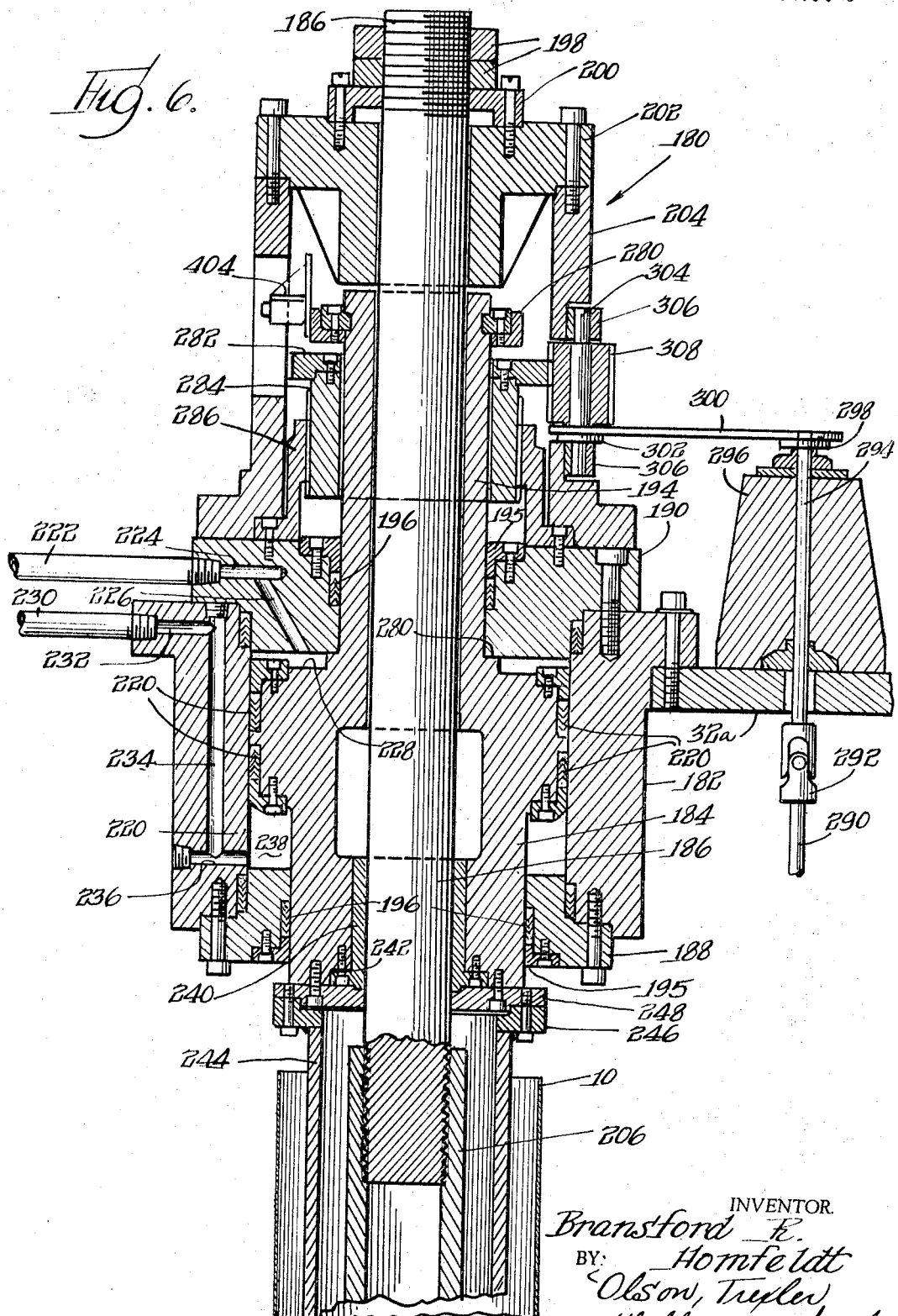

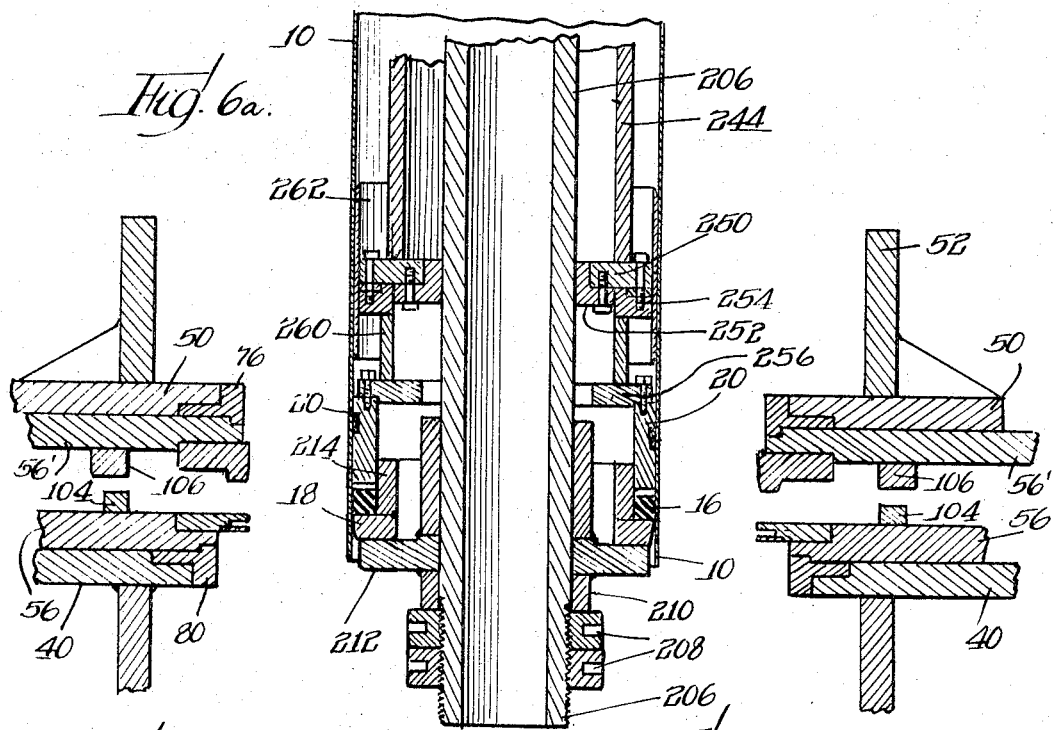
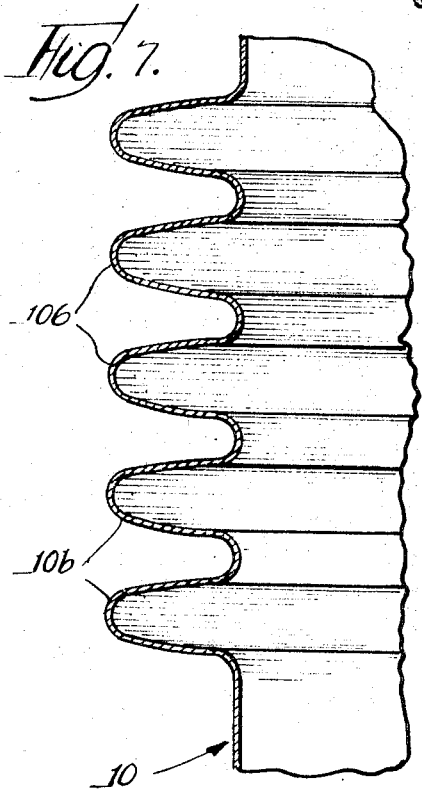
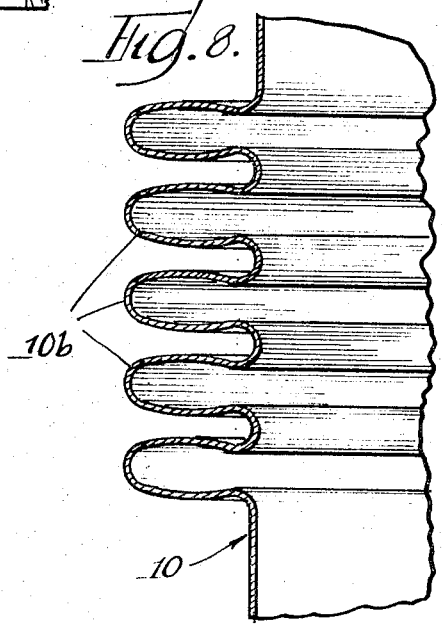

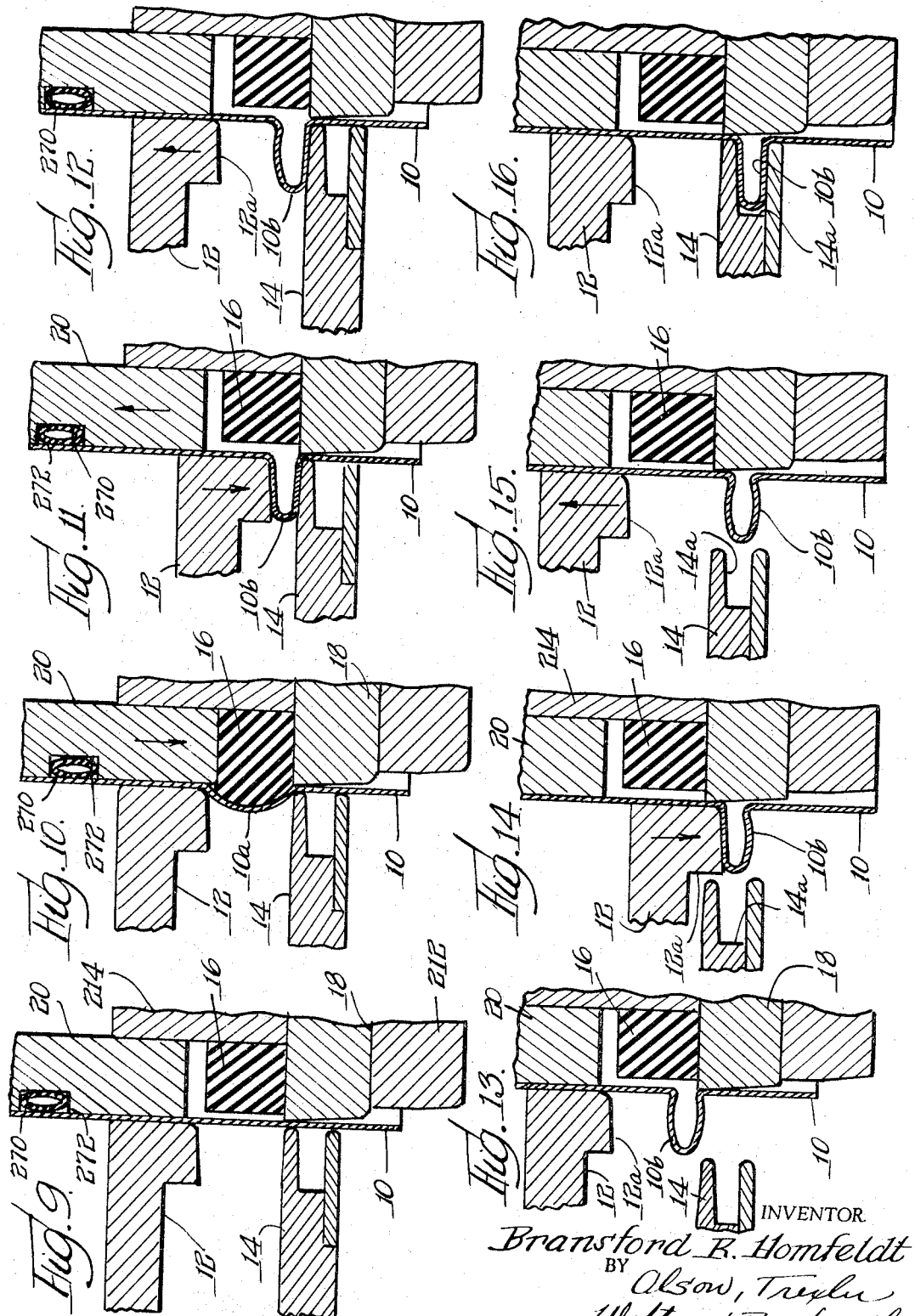

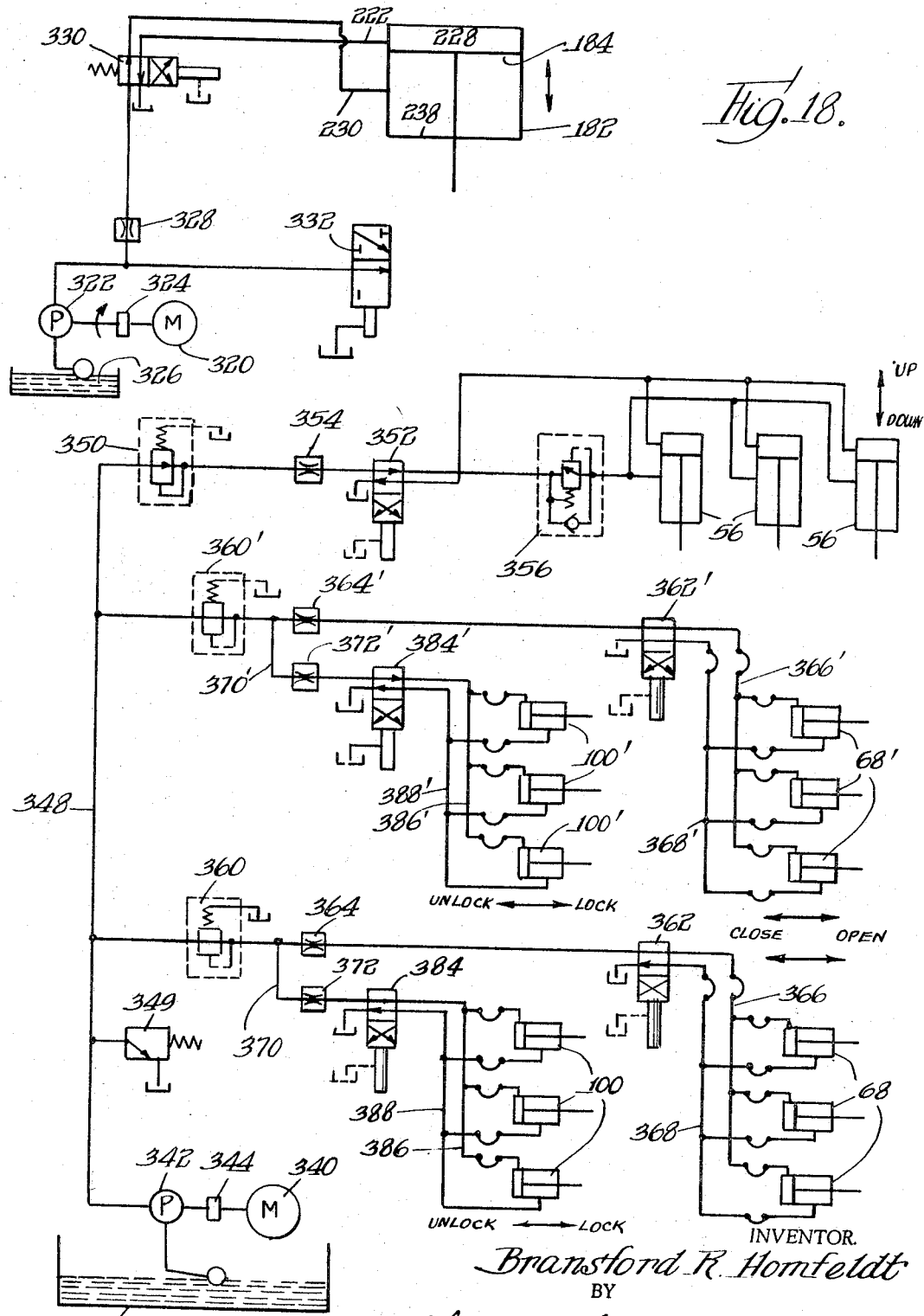

3,339,386
LARGE CORRUGATOR
Bransford R. Homfeldt, Elgin, Ill., assignor to Calumet
& Hecla, Inc., Chicago, Ill., a corporation of Michigan
Filed May 7, 1964, Ser. No. 365,722
16 Claims. (Cl. 72—59)

This invention concerns apparatus for making annular convolutions in the sidewalls of tubular workpieces, and it particularly relates to improved apparatus adapted to handle workpieces of the larger diameters.

To establish efficient production of corrugated or convoluted tubing, it is desirable that the finished convolution conform closely to the designed specified tolerances, and that it also be free from tool marks from the forming apparatus. For tubes of the larger sizes, for example, those in the range from 8 to 30 inches in diameter or greater, to be fabricated within this desideratum, closely fitting die structures are usually required with the provision that such close fitting not introduce scratches on the workpiece when the dies are disengaged therefrom.

Thus, a general object of the present invention is to provide improved apparatus for forming convolutions on tubular workpieces of the larger sizes, wherein the apparatus incorporates die structures closely fitting such workpieces in the condition for forming convolutions, and retractable from the workpieces in a manner affording a minimum opportunity for imparting tool marks thereto.

Another object of the invention is to provide apparatus of the type described wherein means for pre-bulging the workpiece sidewalls are selectively adjustable to obtain varying extent of pre-bulge.

Still another object of the invention is to provide in a machine for forming convolutions in a radially unrestrained section of a tubular workpiece by first causing the unrestrained section to be outwardly bulged and then axially compressing the bulge section, a facility for changing the length of such unrestrained section independently of changing the extent of the bulge.

Yet another object of the invention is to provide in apparatus of the type described having means closely fitting the workpiece for imparting lateral restraint thereto during a pre-bulge operation, an arrangement whereby such restraining means are disposed in concentric relation with the workpiece and maintained in such relationship in a positive manner during the convolution forming operations.

Still another object is to provide in apparatus of the type described having segmented die means disposed for lateral travel with respect to a tubular workpiece, an arrangement of such die means wherein only a small amount of relative travel between the workpiece and the die means occurs during die retraction.

A further object of the invention is to provide an improved convolution forming apparatus adapted to accommodate a tubular workpiece in a flexible and efficient operation over a long service life.

The structure useful in practicing the invention includes a workpiece bulging mandrel, a carriage movable axially of the mandrel and having segmented restraining die means thereon, a second set of restraining die means, and stop means for limiting the travel of the carriage to establish the length of its retraction and advancement strokes.

Particular features of the invention, both as to its organization and method of operation, together with further objects and advantages, will best be understood by reference to the following specification taken in connection with the accompanying drawings wherein like reference numerals designate like parts throughout, in which:

FIG. 1 is a fractured, elevational view of an exemplary form of the convolution forming apparatus of the present invention;

FIG. 2 is an enlarged, horizontal sectional view taken in the direction of the arrows along the line 2—2 of FIG. 1;

FIG. 3 is a view similar to FIG. 2 taken in the direction of the arrows along the line 3—3 of FIG. 1;

FIG. 4 is a greatly enlarged, fragmentary, vertical sectional view taken generally in the direction of the arrows along the line 4—4 of FIG. 1;

FIG. 5 is an enlarged, fragmentary, vertical sectional view taken in the direction of the arrows along the line 5—5 in FIG. 2;

FIG. 6 is a fragmentary, vertical sectional view of the top portion of a mandrel apparatus of the present invention;

FIG. 6a is a view like FIG. 6 but showing the lower portion of the mandrel apparatus;

FIG. 7 is an enlarged, fragmentary, vertical sectional view of a tubular workpiece formed in the instant apparatus showing the convolutions thereof in an open pitch configuration;

FIG. 8 is a view like FIG. 7 but showing the convolutions in a closed pitch configuration;

FIGS. 9–16 are fragmentary, vertical sectional views illustrating a sequence of operations for forming a convolution in a workpiece and for indexing the workpiece for receiving a subsequent convolution;

FIG. 18 is a diagrammatic representation of the hydraulic circuitry of the present convolution forming apparatus.

Figure 17:
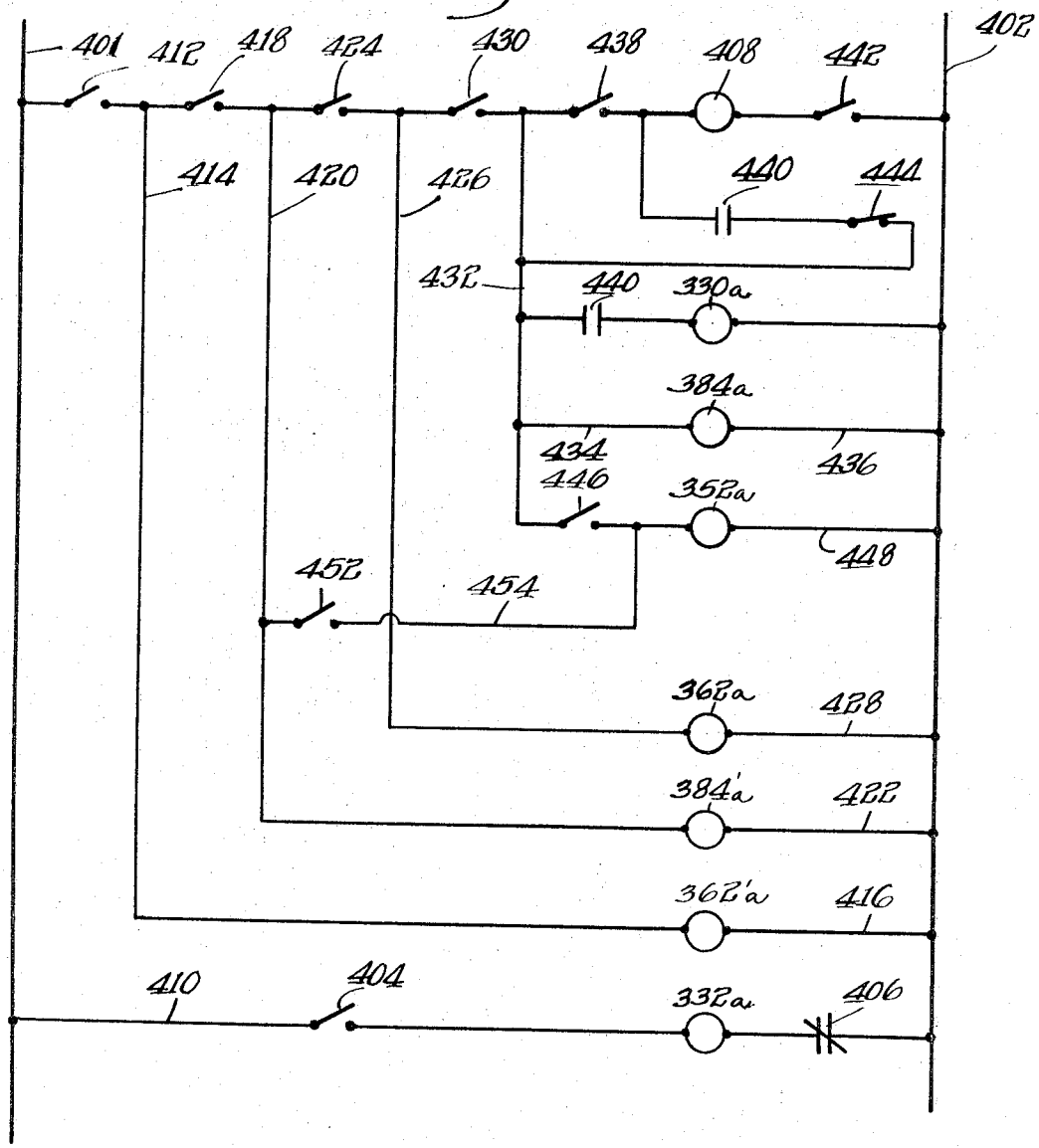
FIG. 17 is a schematic representation of the electrical control circuitry of the exemplary convolution forming apparatus.

With reference to the drawings there will be first described the sequence of steps wherein the apparatus of the present invention forms a convolution in a tubular workpiece, and to this end attention is directed particularly to FIGS. 9–16 where the tooling is shown in vertical section, the left portion thereof being shown fragmentarily, the right portion being omitted. In FIG. 9 there is shown a workpiece 10, in this case a tubular metal element preferably of a large diameter on the order of twenty-four inches, restrained at two axially spaced positions from lateral or radial outward movements by an upper die 12 and a lower die 14 spaced apart to define a gap therebetween. Disposed within the workpiece 10 radially inwardly of the gap between the dies 12, 14 is an elastomeric ring member 16 supported vertically by an anvil 18 in position to receive the downthrust of a ram 20 disposed thereabove. Thus, in the initial position for forming a convolution the upper and lower dies 12 and 14 respectively proximally confront the tubular workpiece 10, there being a space between the dies 12, 14 and workpiece 10 having a radial dimension of approximately twenty thousandths (.020) of an inch.

From the position of FIG. 9, the ram 20 descends upon the elastomeric member 16 to compress it axially and force the body thereof radially outwardly against an unrestrained portion 10a of the workpiece 10 intermediate the upper and lower dies 12 and 14 respectively, thereby bulging the unrestrained portion 10a of the workpiece radially outwardly into the gap between the dies 12, 14, as shown in FIG. 10. Thereafter, as shown in FIG. 11, the ram 20 is retracted from the elastomeric member 16 moving upwardly thereby permitting the member 16 to return to its relaxed condition. At this point the upper die 12 moves downwardly to form the bulged portion 10a into a convolution 10b while the lower die 14 remains vertically fixed.

Thus in the sequence represented in FIGS. 9–11 there has been formed an annular convolution 10b in a tubular workpiece 10. Following that sequence the tooling of the convolution forming machine is reset to perform an indexing function for placing the workpiece 10 in a position to receive a subsequent convolution.

Referring now particularly to FIG. 12, in the initial stage of the indexing sequence the upper die 12 is stroked upwardly to much the same position as it had at the beginning of the forming stroke shown in FIG. 9. At this juncture it is to be appreciated that the workpiece 10 may be maintained in the shown position with respect to the tooling by virtue of friction between the workpiece 10 and tooling, particularly that tooling disposed within the workpiece 10 which will be fully described hereinafter.

Referring now to FIG. 13, the lower die 14 is retracted radially or laterally away from the workpiece 10 a distance greater than the outside diameter or lateral width of the convolution 10b. Thereafter the upper die 12 is stroked downwardly, a chin portion 12a thereof engaging the convolution 10b and carrying it downwardly to the end of the stroke of upper die 12. The downstroke of the die 12 may be set so as to dispose the convolution 10b in register with a pocket 14a in the lower die 14 and with the convolution 10b positioned laterally opposite the pocket 14a, the upper die 12 is stroked upwardly as shown in FIG. 15. Once the upper die 12 and particularly the chin 12a thereof have cleared the lower die 14, the lower die 14 can be moved laterally or radially inwardly toward the workpiece to receive the convolution 10b within the pocket 14a. At this point it is to be recognized that the members 12, 14, 16 and 20 are disposed as shown in FIG. 9, the beginning of a convolution forming operation. As positioned in FIG. 16 the tubing 10 is disposed to receive a subsequent convolution 10b in the sequence of FIGS. 9–11.

Following a series of forming and indexing steps there will be formed on the workpiece 10 a plurality of convolutions 10b having an appearance of those illustrated in FIG. 7 which are known in the art as "open pitch" convolutions. The workpiece 10 may be removed from the convolution machine and axially compressed to form "closed pitch" convolutions as shown in FIG. 8 should it be desired.

Referring now to FIG. 1 of the drawings there is shown a convolution forming machine designated generally 30 made in accordance with and embodying the principles of the present invention. The machine 30 includes a massive frame 32 upstandingly arranged upon a floor or other support surface 34, there being mounted on the frame 32 a vertically movable carriage 36.

The frame 32 is provided with pedestal structure 38 vertically supporting a horizontally disposed table structure 40. Taking FIG. 1 in conjunction with FIGS. 2 and 3 it will be seen that four vertical posts 42 are disposed at the corners of the table 40 and extend upwardly therefrom to support a top works or canopy 43 of the machine 30.

Arranged on the top surface of the table 40 inwardly of the posts 42 are three somewhat stubby vertical guides or ways 44 which serve to maintain the carriage 36 in sliding relationship with respect to the frame 32. Referring particularly to FIGS. 1 and 2, it will be seen that inwardly of each way 44 the carriage 36 includes a vertical post 46 having portions thereof in slidable engagement with the adjacent way 44 and extending upwardly therefrom to a massive ring member 48 (shown in FIG. 1) which defines the head-frame of the carriage 36. At their lower ends the posts 46 are rigidly mounted on a tri-armed or truncated star-shaped base plate 50, as shown in FIG. 2. Thus the general structure of the carriage 36 is defined by the vertical posts 46 maintained horizontally at their upper ends in an equi-arcuate arrangement by the head frame 48 and similarly maintained and fixed securely at their lower ends to the base plate 50. A ring girder 52 having three pairs of radially outwardly extending, vertically arranged stiffeners 54 is secured to the base plate 50 and adds further rigidity to the carriage 36, as best shown in FIG. 2.

Referring to FIG. 1, for purposes of moving the carriage 36 vertically along the ways 44 three vertically oriented, hydraulic cylinders 55 mounted on the top works or canopy 43 of the frame 32 each project a piston rod downwardly for interconnection with the carriage headframe 48. Thus when hydraulic fluid under pressure is selectively admitted to the cylinders 55 the carriage 36 will be caused to move in the selected direction.

The upper dies 12 and lower dies 14 referred to above are mounted for lateral movements respectively on the base plate 50 and the table 40. Considering first the arrangement of the lower dies 14, shown best in FIG. 3, each die 14 comprises at its inner or forming periphery one-third of a circular segment, each die 14 being mounted upon a slide 56 movable laterally of the workpiece 10 along a path substantially radial thereof. Outwardly of the die 14 each slide 56 is provided with a guide arm 58 having along opposite side edges thereof bearing surfaces 60 adapted to cooperate with guide structures 62 securely bolted to the table 40. Inwardly of the guide arm 58 each slide 56 is provided with a second pair of bearing surfaces 64 cooperable with a second set of guide structures 66. Thus the bearing surfaces 60, 64 cooperating respectively with the guide structures 62, 66 serve to maintain each slide 56 in slidably aligned relationship with respect to the workpiece 10.

The structures slidably supporting the upper dies 12 are slides 56' similar in arrangement to the slides 56 carrying the lower dies 14, best shown in FIG. 5. The guide structures (not shown) supporting the upper slides 56' are also similar in construction and arrangement to the guide structures 62, 66 previously described.

Provisions for effecting lateral advancement and retraction of the upper dies 56' are incorporated in the machine 30 to facilitate fitting the workpiece 10 into the machine. Thus, each slide 56' is provided with a hydraulic cylinder 68', shown best in FIGS. 2 and 5. The body of each cylinder 68' extends through a rectangular opening 70' in the base plate 50 (clearly shown in FIG. 2) and is fixedly secured to the slide 56'. A piston rod 72' projecting from the body of the cylinder 68' is fixedly secured to the plate 50 being threadably received within a socket 74', as shown in FIG. 5. Thus as hydraulic fluid under pressure is admitted to the cylinder 68' the upper slide 56' may be advanced towards the workpiece 10 or retracted therefrom depending upon the selected direction of fluid pressure flow to the cylinder 68'.

To arrest inward motion of the upper slide 56' at a predetermined point and to maintain the upper dies 12 carried thereby in concentric relationship with respect to the other upper dies 12, a stop ring 76 is mounted to the base plate 50 so as to engage a shoulder 78 of the slide 56', as shown in FIG. 5. A projection 76a of the ring 76 is accurately machined along its outer periphery so as to conform closely to the shoulder 78 of the slide 56' and thereby insure that each of the three slides 56' upon converging on the outer periphery of the projection 76a will present the upper dies 12 towards the workpiece 10 in a manner concentric with the workpiece 10.

Similarly, the lower slides 56 are propelled along their respective paths by hydraulic cylinders 68 mounted thereon, the piston rods of the lower die cylinder 68 being fixedly secured to a member 74 on the table 40, shown best in FIG. 5. Whereas the cylinders for moving the upper slides 56' are mounted above the respective slides 56', the cylinders propelling the lower slides 56 are mounted beneath the respective slides 56, each being disposed in a rectangular cutout in the table 40 similar to the opening 70.

An abutment ring 80 mounted on the table 40 arrests inward movement of each lower slide 56 at an accurately predetermined point by engagement of a shoulder 82 of the slide 56 with a projection 80a on the ring 80. Thus when fluid under pressure is admitted to the lower cylinders 68, the lower slides 56 and lower dies 14 carried thereby may be moved from the position as shown in FIGS. 9–12 to those shown in FIGS. 13–15.

Referring now to FIGS. 3 and 5 cam means are provided to insure that each lower slide 56 is maintained securely against the stop or abutment ring 80 during the forming operation. More specifically, a substantially semi-circular cam lobe 86 is carried by a cam shaft 88 rotatably mounted in a vertical position on the table 40, as shown in FIG. 5. A cam block 90 is mounted in the guide arm 58 of each slide 56, shown best in FIG. 3. A second cam block 92 is carried by the table 40 outwardly of the cam shaft 88, the second cam block 92 being restrained by a U-shaped retainer 94 mounted to the table 40.

Disposed beneath the table 40 on the cam shaft 88 is a pivot arm 96 movably mounted at its outer end to a clevis 98 of a piston rod projecting from a hydraulic cylinder substantially similar to that shown in FIG. 2 for the upper slide structure and designated there by the numeral 100'. Thus as the arm 96 is rotated by its associated hydraulic cylinder the cam 86 is urged against the blocks 90 to force the slide 56 firmly against the ring 80. The outward reaction on the cam 86 is taken by the block 92 rigid with the table 40. It is to be understood that rotation of each cam 86 is effected by a hydraulic cylinder mounted substantially similar to that shown in FIG. 2 at 100'.

Each of the upper slides 56' is maintained in firm engagement with the upper abutment ring 76 by a cam 86' similar to the cam 86 cooperable with the lower slide 56. Similarly, the cam 86' is fixedly mounted upon a cam shaft 88' rotatably carried by the base plate 50. Disposed above the plate 50 on the end of the shaft 88' is a pivot arm 96', the outer end of which is pivotally secured to a clevis 98' of a piston rod for the hydraulic cylinder 100', best shown in FIG. 2. The body of the cylinder 100' is affixedly secured to the base plate 50. Thus as hydraulic fluid under pressure is admitted to the cylinder 100' to advance or retract the piston rod thereof the cam 86' may be urged into forceful engagement with the slide 56' for maintaining a firm abutting relationship with the arrestment ring 76. It is to be understood that the three cylinders 100' associated with the cam means 86' may be connected into one hydraulic circuit to effect simultaneous actuation thereof. The hydraulic cylinders for operating the cams 86 associated with the lower slides 56 may also be united in a single hydraulic circuit for simultaneous actuation of the three cams 86 to urge the three slides 56 each into engagement with the ring 80. It is also to be understood that the lower slides 56 are retractable independently of movements of the upper slides 56'. Thus it follows that the cam locks 86 for the lower slides 56 are actuatable independently of the cam locks 86' for the upper slides 56'.

As mentioned previously the carriage 36 and consequently the upper dies 12 are arranged to move vertically towards and away from the lower dies 14 to perform convolution shaping and workpiece indexing functions, as shown respectively in FIGS. 11 and 14. When the carriage 36 is moved in the downward forming stroke, it is important that the upper dies 12 be arrested at a predetermined point to give the convolution 10b the desired width. Referring particularly to FIGS. 3 and 5, a spacer block 104 is centrally arranged on each lower slide 56 to cooperate with the similarly disposed spacer block 106 depending from the lower surface of the upper slide 56', shown best in FIG. 5. When the upper and lower slides 56' and 56 respectively are in the closed position the blocks 104, 106 are confrontingly arranged so as to engage as the carriage 36 and upper slide 56' are lowered, thereby arresting further downward movement of the upper dies 12. When the blocks are engaged the gap between the chin 12a of upper die 12 and the horizontal top surface of the lower die 14 is equal to the width of the convolution 10b. Alternatively, a single spacer block disposed on one of the slides 56, 56' would perform the function of the blocks 104, 106.

When the lower slides 56 are retracted for indexing the workpiece 10 to receive a subsequent convolution 10b, the spacer block 104 is moved to the position as indicated in broken lines in FIG. 5 thereby to provide clearance for the upper block 106 as the carriage 36 and upper dies 12 descend towards the lower dies 14 to carry the convolution downwardly as is shown in FIG. 14.

In connection with the downward indexing stroke of the carriage 36 it is essential that the length of the stroke be accurately established so as to position the workpiece 10 and convolution 10b in operative association with the lower dies 14 as shown in FIGS. 15 and 16. In certain instances it may be desirable to space the convolutions 10b axially at different pitches along the workpiece 10. Thus in these instances the carriage 36 and upper dies 12 would descend correspondingly at different intervals with respect to the lower dies 14. As discussed above the stop blocks 104, 106 are disposed in a non-engaging position during the indexing stroke of the carriage 36.

Referring now particularly to FIGS. 3 and 4, three carriage index-stops 110 are vertically arranged on the table 40 to project upwardly therefrom for engagement with the base plate 50 of the carriage 36. Each carriage index-stop 110 is arranged inwardly of a post 44 adjacent the second guide structures 66, clearly shown in FIG. 3. Each index-stop 110 includes a housing 112 upstandingly arranged with respect to the table 40 and secured thereto by a collar 114. Being open at its upper end and hollow within, the housing 112 contains a stop pin 116 projecting above the housing 112 towards the carriage base plate 50, clearly shown in FIG. 4. The stop pin 116 extends substantially the entire length of the housing 112 and at its lower section the pin 116 is equipped with threads adapted to cooperative with an internally threaded portion of the housing 112 as at 118.

For purposes of rotating the stop pin 116 so as to propel it along the threaded portion 118 a lower section 120 of the housing 112 is equipped with a gear box 122 (see FIGS. 1 and 4) having disposed therein a worm gear 124 or operatively engaging the worm wheel 126 secured to a shaft 128 rotatably mounted in a vertical position with respect to the gear box 122. Projecting upwardly from the gear box 122 the shaft 128 is slidably received in a bore 130 disposed in the lower end of the stop pin 116. A vertical key 132 locks the shaft 128 to the stop pin 116 for purposes of rotating the pin 116, the keyway for the key 132 being so arranged as to afford vertical sliding movements between the shaft 128 and walls of the bore 130. As the worm gear 124 is rotated, movement is imparted to the shaft 128 to rotate the pin 116 and thereby advance or retract it with respect to the plate 50 and thereby establish a predetermined lower stop point for terminating the index stroke of the carriage 36.

To insure that the free ends of the three stop pins 116 are all disposed in the same plane transmission means are provided beneath the table 40 to interconnect the worm gears 124 of the three carriage index-stops 110, shown best in FIG. 1. More specifically, the shaft to which the worm gear 124 is secured projects outwardly of either side of the gear box 122, and is coupled at each end through a drive shaft 134 supported by the table 40 and having a bevel gear 136 in meshing engagement with a second bevel gear 138 of a second drive shaft 140 disposed at an angle to the drive shaft 134, best shown in FIG. 1. A hand wheel 142 arranged at an operator's station of the apparatus 30 is included in the transmission to rotate the shaft 134 and thereby the worm gears 124. As the hand wheel 142 is rotated the three stop pins 116 will be responsively advanced or retracted in synchronization, and will each be equidistantly spaced vertically with respect to the abutment surface of a base plate 50.

Following arrestment of the carriage 36 in the indexing stroke by the carriage index-stops 110, the carriage 36 is retracted into position to commence a forming stroke (see FIGS. 9, 15 and 16). As was the case for the indexing stroke, the carriage 36 must be arrested at a predetermined upper position in the forming stroke so as to dispose the upper dies 12 in the proper position for imparting lateral restraint to the workpiece 10. It is to be recognized that as the carriage 36 and the upper dies 12 carried thereby are moved farther apart from the lower dies 14 a greater axial unrestrained length of workpiece is presented to the elastomeric ring whereby when the ring 16 is compressed the bulge portion 10a will be correspondingly longer and upon compression of the bulge portion 10a will produce a convolution 10b of correspondingly greater height. Thus by controlling the gap between the chin 12a of upper die 12 and the lower dies 14 convolutions of different height may be formed by the apparatus 30.

Referring now particularly to FIG. 1, gap control stops 150 are mounted on the top works 43 of the frame 32 and project downwardly therefrom into engagement with the head-frame 48 of the carriage 36. Preferably three gap control stops 150, having internal detail substantially similar to the index stop 110, are arranged outwardly of the posts 46, the head-frame 48 being provided with three laterally projecting ears 152 each supporting a cylindrical stop pad 154 for engagement with a selectively projectable upper stop pin 156 of the control stop 150, one such stop pin 156 being rotated into the plane of projection at the right hand portion of FIG. 1. An upper gear-box 158 enclosing a worm-gear and worm-wheel (not shown) similar to the wheel and gear 126, 124, imparts rotatable motion of the stop pin 156 for advancement and retractino with respect to the pad 154.

Projecting laterally on each side of the upper gear box 158 is a drive shaft 160 driven by bevel gears 162, one pair of bevel gears at the right hand portion of the apparatus 30 as shown in FIG. 1 being drivingly connected to a vertically arranged shaft 166 driven by a hand wheel 168 mounted on the table 40 at an operator's station of the apparatus 30. As an operator rotates the hand wheel 168 the upper stop pins 156 are advanced and retracted in synchronization to maintain the free ends thereof in the same horizontal plane thereby to arrest the carriage 36 at a preselected point of upward travel.

It will be recognized that the upper portion of the carriage 36 extends a substantial distance above the short guide members 44. In view of this arrangement it is desirable to provide means at the upper portion of the carriage 36 to augment the locating function of the guide members 44. To this end a trio of roller guides 170, two being shown in FIG. 1, are mounted on the head-frame 48 in an equiarcuate spaced arrangement. A roller 172 of each guide 170 engages the cylindrical body of a hydraulic cylinder 182 described below. Thus by maintaining rolling contact with the cylinder 182 as the carriage 36 is reciprocated, the guide rollers 172 serve to further insure that the carriage 36 moves in a straight path.

For arranging the workpiece 10 in operative position with respect to the convolution forming machine 30 and for purposes of placing a bulge therein, a mandrel structure 180 is centrally mounted on the frame 32. Referring now particularly to FIGS. 1, 6 and 6a, the mandrel structure 180 includes a large hydraulic cylinder 182 having a vertically movable piston 184 slidably mounted with respect to a stationary central shaft 186, best shown in FIG. 6. The body of the hydraulic cylinder 182 is fixedly secured to a top plate 32a of the frame 32, the lower end of the cylinder 182 being closed by a bottom cap 188 through which the piston 184 projects. The upper end of the cylinder 182 is closed by a top cap 190 which receives therethrough, projecting upwardly, an elongated neck 194 of the piston 184. Packing glands 195 and associated packing materials 196 provide a seal between the piston 184 and the caps 188, 190.

The stationary shaft 186 is threaded at its upper end to receive a pair of nuts 198 which, in turn, are supported by a keeper-collar 200 bolted to a massive cover 202 of a cylindrical casing 204 mounted at its lower terminus to the top cap 190.

The central shaft or column 186 projects downwardly from the lower portion of the piston 184 and, being threaded at its lower end, the column 186 receives threadably thereon a tubular strut 206 which projects downwardly to terminate beneath the table 40, shown best in FIG. 6a. A pair of nuts 208 threadably secured to the bottom end of the strut 206 vertically support a collar 210 having a flange 212 arranged thereabove for supporting vertically the anvil 18 about which the elastomeric ring 16 is disposed, the anvil 18 being provided with a backup collar 214 to restrict radial inward movement of the ring 16. Thus it will be understood that the elastomeric ring member 16 is supported vertically and maintained fixed with respect to the frame 32 through means of the strut 206 joined to the shaft member 186.

Referring again to FIG. 6, the hydraulic piston 184 is disposed for sliding movements with respect to the internal walls of the cylinder 182, seals 220 being arranged between the piston and the cylinder walls along the pressure receiving areas of the piston 184. Hydraulic fluid under pressure may be admitted through an upper conduit 222 communicating with a horizontal bore 224 which communicates with the skewed bore 226 opening into the pressure chamber 228 of the cylinder 182 to provide pressure on the top side of the piston 184 to cause it to descend with respect to the central shaft 186.

A second conduit 230 communicating with the bore 232 in the body of the cylinder 182 opens into a vertical passageway 234 which in turn opens into a second horizontal bore 236 communicating with pressure chamber 238 on the lower side of the piston 184. When fluid under pressure is supplied to the upper pressure chamber 228 fluid may escape from the lower chamber 238 through the passageway 236, connected to the upper end of the vertical bore 234, the outer end of bore 236 being plugged.

To maintain the central shaft 186 in concentric sliding relationship with respect to the piston 184 an elongated sleeve bearing 240 is arranged in the lower end of the piston 184 being fixedly secured thereto by means of a lateral flange 242 and a plurality of bolts.

Fixedly mounted to the lower end of the piston concentric with the strut 206 is a hollow tubular arbor 244 having a flange 246 bolted to a second flange 248 carried by the piston 184, best shown in FIG. 6.

Referring now to FIG. 6a, the lower end of the arbor 244 is equipped with an annular flange 250 having a guide bushing 252 along the inner periphery thereof for engagement with the strut 206. Below the flange 250 is disposed a spaced pair of rings 254, 256 maintained apart by a spacer 260. Mounted to the lower of the two rings 256 is the collar-like ram 20 which engages at its lower edge the elastomeric ring 16, the inner surface of the ram surface 20 being slidably disposed with respect to the backup collar 214.

A tube guide 262 is secured to the flange 250, the guide 262 having an outside diameter substantially complementary to the inside diameter of the tubular workpiece 10 for maintaining the workpiece 10 concentrically on the mandrel 180. It is to be understood that between the tube guide 262 and the workpiece 10 there is a significant area of frictional engagement adequate to support the workpiece 10 with respect to the mandrel structure 180. Additionally, an inflatable workpiece holding means may be provided in the ram 20 taking the form of a hollow tube 270 supported in a recess 272 in the ram 20 opening towards the workpiece 10, best shown in FIGS. 9–12.

Thus it will be understood that as hydraulic fluid under pressure is admitted to the upper pressure chamber 228, suitable pressure relief being provided to the lower chamber 238, the piston 184 will be urged downwardly pushing the arbor 244 and the ram 20 to engage the ring 16. Conversely, as fluid under pressure is admitted to the lower pressure chamber 238, suitable pressure relief being had in the upper chamber 228, the piston 184 will be urged upwardly carrying the arbor 244 and ram 20 away from the ring 16. Thus it will be seen that the forming stroke and retraction stroke of the piston and ram is thereby effected. It is to be noted that on the upstroke the piston 184 is arrested by engagement of a shoulder 280 thereon with the top cap 190.

The mandrel structure 180 is suitably equipped to control the downstroke of the ram 20 and thereby the extent of compression of the elastomeric member 16 for producing a bulge 10a of selectively variable amounts in the sidewall of the tubing. Referring now particularly to FIG. 6, the elongated or neck portion 194 of the piston 184 is equipped with a stop collar 280 fixedly secured thereto proximate the upper end thereof. Slidably disposed with respect to the neck 194 is an abutment gear 282 carrying beneath it an annular worm-gear 284 which is also slidably disposed with respect to the neck portion 194 of the piston 184. The worm-gear 284 meshes with an internally threaded frame portion 286 mounted on the top cap 190 radially inwardly of the cylindrical casing 204. Thus as the spur gear 282 is rotated, the worm-gear 284 is caused to advance axially toward or away from the collar 280 secured to the piston 284, the downstroke of the piston 184 being limited by the abutting engagement of the collar 280 with the abutment gear 282.

It is desirable that the distance between the abutment gear 282 and collar 280 be adjustable from the operator's station on the convolution forming machine 30. To that end a hand wheel 288 is suitably mounted whereby rotation of the hand wheel 288 serves to set in motion a skewed drive shaft 290 which extends upwardly to the top works of the frame 32, as shown best in FIG. 1. At its upper end the drive shaft 290 is connected at a U-joint 292 to a vertically arranged shaft 294 rotatably supported on the top plate 32a by the housing 296. At the upper end of the vertical shaft 294 is arranged a sprocket 298 having entwined thereabout a chain 300 which engages a second sprocket 302 fixedly secured to a stub shaft 304 supported vertically of the cylindrical casing 204 by pillow blocks 306. Fixedly secured to the stub shaft 304 intermediate the upper pillow block 306 and the second sprocket 302, is an axially elongated pinion gear 308 arranged for meshing engagement with the abutment spur gear 282. Thus as the pinion gear 308 is rotated to produce rotation in the abutment gear 282 and consequent axial advancement or retetraction of the worm-gear member 284 with respect to the collar 280, the abutment gear 282 slides axially of the pinion 308. Thus by rotation of the hand wheel 288 at the operator station the abutment gear 282 can be moved selectively towards or away from the collar 280 which in turn limits the downwardly or compressing movement of the piston 184 and thereby the extent of bulge produced in the workpiece 10.

A hydraulic circuit adapted to actuate the cylinder 182 to produce a bulge in the workpiece is shown diagrammatically at the upper portion of FIG. 18. The circuit there shown includes an electric motor 320 joined to a hydraulic pump 322 by a coupling 324 for withdrawing hydraulic fluid from a reservoir 326. The pump 322 delivers hydraulic fluid under pressure through a flow control valve 328 which serves to regulate the speed of downward travel of the piston 184 and thereby the speed of bulge formation.

From the flow control valve 328 hydraulic fluid is passed to a solenoid operated four-way valve 330 which is selectively actuatable for directional control of the piston 184 within the cylinder 182. One side of the valve 330 is connected to the conduit 222 for admitting fluid to the upper chamber 228 above the piston 184. The other side of the four-way valve 330 communicates with conduit 230 for admitting hydraulic fluid under pressure to the lower pressure chamber 238. A relief valve 332 with a reservoir return is provided downstream of the flow control valve 328 and upstream of the pump 322.

A second hydraulic circuit for controlling the carriage stroke, opening and closing both the upper and lower slides 56' and 56 respectively and/or locking the slides 56 is shown schematically in the central and lower portion of FIG. 18. The second hydraulic circuit there shown includes a motor 340 drivingly interconnected to a hydraulic pump 342 by a coupling 344 for withdrawing hydraulic fluid from a second reservoir 346.

For moving the carriage 36 in forming, indexing and retraction strokes the pressure side of the pump 342 is connected with the three hydraulic cylinders 55. More specifically, the pump 342 delivers high pressure hydraulic fluid to a supply line 348 in communication with a pressure reducing valve 350 for selectively reducing the pressure of the fluid admitted to the cylinders 55. Directional control over fluid flow to the cylinders 55 is effected by a pilot operated solenoid, four-way valve 352 which is in communication with the upper and the lower portion of the cylinders 55. Intermediate the directional control valve 352 and the pressure reducing valve 350 is a flow control valve 354. As a safety precaution a counterbalance valve 356 is arranged in the circuit between the sylinders 55 and the directional control valve 352 to maintain the carriage 36 in the "up" position should the pump 342 be turned off.

Directional control of the carriage 36 is effected by proper actuation of the directional control valve 352. When the motor 340 and pump 342 are stopped the carriage may be maintained in its upper position by the counterbalance valve 356 thereby facilitating working on the carriage 36 for replacing and adjusting the tooling or the like.

The hydraulic mechanism for actuating the lower slides 56 and associated cams 86 is substantially similar but operable independently of the hydraulic system for actuating the upper slides 56' and the associated upper cams 86'. The two circuits are shown in the bottom half of FIG. 18. Only one will be described in detail.

A presure reducing valve 360 is arranged in communication with the main supply line 348, the low pressure side of the valve 360 being connected to a four-way solenoid operated directional control valve 362 which controls the admission of hydraulic fluid under pressure to the hydraulic cylinder 68 for actuating the slides 56. Intermediate the control valve 362 and the reducing valve 360 is the flow control valve 364. By selective actuation of the control valve 362 hydraulic fluid under pressure may be admitted to the upper side of the cylinder 68 through line 366. When the control valve 362 is centrally positioned, fluid under pressure is submitted through line 368 to the inner side of the piston and fluid returns from the low pressure side of the cylinder through line 366 and the valve 362 to the reservoir 344.

For controlling the hydraulic cylinder 100 which serves to rotate the cams 86 or 86' the line 370 on the low pressure side of the valve is provided with a flow control valve 372 in communication with four-way solenoid actuating valve 384 which selectively admits hydraulic fluid under pressure to either end of the cylinders 100 to lines 386 and 388. Thus through selective actuation of valve 384 the piston or cylinders 100 can be projected or retracted to effect locking cams 86 or 86'.

From the foregoing it will be understood that in response to the actuation of certain solenoid valves described above the instant apparatus 30 performs its function of forming annular convolutions 106 on the workpiece 10. Referring now more specificaly to the electrical circuit diagram of FIG. 17, there will be seen a plurality of solenoids designated with numbers complementary to the solenoid valves identified in FIG. 18. More specifically, the solenoid 330a is the actuating device for the valve 330 which controls the flow of hydraulic fluid to the bulge cylinder 182. The solenoid 332a is the electrical actuatable portion of the bulge relief vent valve 332. The solenoid 352a is the solenoid portion of the valve 352 which controls the direction of hydraulic fluid flow to the three hydraulic cylinders 56 for upwards and downwards movements of the carriage 36.

The solenoid 362a is the actuating device for the valve 362 which serves to control the opening and closing of the lower slides 56. The solenoid designated 362'a forms a portion of the solenoid valve 362' which actuates by means of the cylinders 68' the upper slides 56'. The solenoid 384a is the actuating portion of the valve 384 operable to control the locking of the lower slides 56 through rotation of the cam 86. Similiarly, the solenoid 384'a forms a portion of the valve 384' which cooperates with the hydraulic circuitry to lock the upper slides 56' in their closed position.

The aforementioned solenoids may be incorporated in a 110-volt AC circuit between the lines 401 and 402. A limit switch 404 is interposed between line 401 and the solenoid 332a, the limit switch 404 being closed when the piston 184 is in the "up" position. A set of normally closed contacts 406 of a control relay 408 permit electrical communication from line 401 to line 402 to a line 410 in which the limit switch 404, solenoid 332a, and the closed contacts 406 are connected. Thus there is provided electrical means for actuating the bulge relief vent valve 332.

A switch 412, either manually or semi-automatically actuable, is connected to line 401 and a line 414 which, in turn, is connected to solenoid 362'a for energizing the solenoid 362'a for operation to close the upper dies or slides 56', a line 416 connecting the solenoid 362'a with the line 402. A switch 418 similar to the switch 412 permits current to flow to the solenoid 384'a through a line 420 when the first switch 412 is closed, the solenoid 384'a being connected by a line 422 to the line 402 for locking the upper dies 12 in the closed position.

For closing the lower slides 56 a switch 424 permits a current to flow from line 401 when switches 412 and 418 are closed, the current flowing then through a line 426 to the solenoid 362a and then through lines 428 to line 402. To lock the lower slides through rotation of the cams 86 a current may flow from line 401 through the switches 412, 418, 424 in their closed condition and through a switch 430 to the line 432 through the solenoid 384a which is connected to line 432 by a line 434 and to the line 402 by a line 436.

To energize solenoid 330a and thereby to permit hydraulic fluid to flow into the chamber 228 above the piston 184 for depression of the piston, a switch 438 is momentarily closed to energize the control relay 404 and control a second set of contacts 440 in the relay 408, a switch 442 and the switches 412, 418, 424, 430 being closed to permit a circuit between line 401 and line 402. The closing of the contacts 440 then permits a circuit to be established through the solenoid 330a to energize the bulge control valve 330 and simultaneously to deenergize the solenoid 332a incorporated in the bulge relief vent valve 332.

At this point in the operation of the cycle the carriage 36 is caused to move downwardly which includes actuation of the solenoid 352a. More particularly, the limit switch 404, normally open, is opened while a second limit switch 444 which is normally closed is opened to deenergize the control relay 408 and to deenergize the bulge control solenoid valve 330a. At this point the limit switch 444 which is normally closed is in a closed position while the first limit switch 404 is also closed, thus energizing solenoid 352a from line 401 to line 410 and through the normally controlled contacts 406 to line 402. This opens the bulge relief vent valve 332. A switch 446 connected to line 432 permits a current to flow to solenoid 352a for moving the carriage downwardly when the switches 412, 418, 424 and 430 are also in the closed position. In this circuit the solenoid 352a is connected to line 402 by a line 448. Thus as the carriage moves downwardly carrying the upper dies 56' the convolution 10b is formed in the workpiece 10 as previously described.

To deenergize the solenoid 352a thereby permitting the carriage 36 to be retracted to its upper position, the switch 446 is opened. Thereafter switch 430 is opened to deenergize solenoid 384a to unlock the lower slides 56, thereby to permit their retraction. In turn, switch 424 is opened to deenergize solenoid 362a permitting the lower slides 56 to be retracted so that the convolution 10b and the workpiece 10 may be moved downwardly. Downward movement of the carriage 36 for indexing the workpiece 10 is effected after the opening of switch 424 to energize the solenoid 352a through the switch 452 which permits a current to flow to line 401 to the closed switches 412 and 418 to line 420 and by means of a line 454 to the solenoid 352a through the line 448 to the line 402.

When the carriage 36 has completed its indexing stroke, the switch 452 may be opened to deenergize the carriage control solenoid 352a thereby permitting hydraulic fluid to move the carriage 36 to its upper position. From this point onward to form a subsequent convolution 10b on the workpiece 10, the cycle is repeated starting with closing switch 424 and the energizing of solenoid 332a of the bulge relief vent valve 332.

It should be noted at this juncture that switch 442 which is normally closed is arranged in the circuit to achieve a second function, namely, an emergency return of the piston 184. This is effected through depression of the switch 442 to cause deenergizing of the control relay 408 thereby opening the contact 440 causing the solenoid 330a to deenergize and the cylinder 184 to move upwardly.

While there has been described what is at present considered to be the preferred embodiment of the invention, it will be understood that various modifications may be made therein, and it is intended to cover in the appended claims all such modifications as fall within the true spirit and scope of the invention.

The invention is claimed as follows:

1. Apparatus for forming a convolution on a tubular workpiece, comprising: a frame; means defining a mandrel mounted on said frame for partially forming a convolution on such tubular workpiece; carriage means movable reciprocally with respect to said frame axially of said mandrel; first and second forming means mounted respectively on said frame and carriage means and cooperable to complete the formation of such convolution, said first and second forming means each including tri-segmented means, each segment being shiftable selectively laterally of said mandrel from a closed position closely adjacent said mandrel to an open position spaced apart therefrom a distance greater than the height of such convolution; stop means for arresting said tri-segment means in a closed position concentric with such workpiece; and mechanical locking means for maintaining said tri-segmented means in said closed position and to preclude unselected retraction thereof during a convolution forming operation.

2. Apparatus for forming a convolution on a tubular workpiece, comprising: a frame; means on said frame for supporting such tubular workpiece in a convolution receiving position; carriage means mounted on said frame for movements axially of such workpiece; first and second forming means mounted respectively on said frame and carriage means and together cooperable to compress axially an annular section of such workpiece to form a convolution therein; said first and second forming means each including tri-segmented die means shiftable selectively from a closed position wherein portions thereof are in closely encircling relationship with such workpiece to an open position wherein such portions are spaced apart from such workpiece a distance greater than the height of such convolution; stop means for arresting said tri-segmented die means in said closed position; and mechanical locking means for maintaining said tri-segmented die means in said closed position and to preclude unselected retraction thereof during a convolution forming operation.

3. In apparatus for forming convolutions on a tubular workpiece, the combination comprising: a frame; partial forming means on said frame operable to form an initial annular bulge in the sidewall of such workpiece, said partial forming means including an elastomeric ring member projectable radially outwardly into forceful engagement with the inside of such workpiece, means to support said ring member with respect to said frame, ram means mounted coaxially of said ring member for compressing said ring member against said support means, a hydraulic cylinder including a piston connected to said ram means for moving said ram means relative to said support means to compress said ring member and thereby to project said ring member radially into forceful engagement with the workpiece, fixed stop means on one of said cylinder and piston, adjustable stop means on the one of said cylinder and piston, and means for incrementally advancing and retracting said adjustable stop means with respect to said fixed stop means axially of said piston to alter the movement of said ram means and the radial projection of said ring member when said ring member is compressed by said ram means.

4. In apparatus for forming convolutions on a tubular workpiece, the combination comprising: a frame; partial forming means on said frame operable to form an initial annular bulge in the sidewall of such workpiece, said partial forming means including an elastomeric ring member projectable radially outwardly into forceful engagement with the inside of such workpiece, means to support said ring member with respect to said frame, ram means mounted coaxially of said ring member for compressing said ring member against said support means, a hydraulic cylinder including a piston connected at one end to said ram means and having annular shoulder means adjacent the opposite end thereof, a collar engageable by said shoulder means and mounted for incremental movement toward and away from such shoulder means respectively to decrease and increase the stroke of said piston in the direction of said ring member, and transmission means for moving said collar means from an operating station on said apparatus.

5. In apparatus for forming annular convolutions on a tubular workpiece, the combination comprising: means for supporting such workpiece in a convolution receiving position; first and second forming means movable relative to each other axially of such workpiece, at least one of said forming means including a trio of forming die segments, slide means carrying each of said die segments, said slide means being shiftable along a path substantially radial of such workpiece from a closed position wherein the die segment carried by said slide means closely confronts a portion of the workpiece periphery, to an open position wherein said die segment is spaced apart from such workpiece a distance greater than the height of such convolution, means to guide said slide means along said path, power means for shifting each of said slide means from said open to said closed position, and means for maintaining said trio of die segments concentric with such workpiece in said closed position.

6. In apparatus for forming an annular convolution on a tubular workpiece, the combination comprising: means for supporting such workpiece in a convolution receiving position; first and second forming means movable relative to each other axially of such workpiece, at least one of said forming means including a trio of forming die segments, slide means carrying each of said die segments, said slide means being shiftable along a path substantially radially of such workpiece from a closed position wherein the die segment carried by said slide means closely confronts a portion of the workpiece periphery, to an open position wherein said die segment is spaced apart from such workpiece a distance greater than the height of such convolution, means to guide said slide means along said path, power means for shifting each of said die means from said open to said closed position, and a continuous circular ring concentric with such workpiece for insuring concentricity of said trio of die segments in said closed position.

7. In apparatus for forming an annular convolution on a tubular workpiece, the combination comprising: means for supporting such workpiece in a convolution receiving position; first and second forming means movable relative to each other axially of such workpiece; carriage means for moving said second forming means towards and away from said first forming means, at least one of said forming means including a trio of slides, each slide being shiftable along a path disposed substantially radially of such workpiece from an inward forming position to an outward indexing position; an annular member arranged concentrically with respect to such workpiece; and shoulder means on said slides engageable in said forming position with said annular member for maintaining said one forming means in concentric relationship with such workpiece, said shoulder means on said slides being spaced apart from said annular member in said indexing position.

8. The apparatus defined in claim 7 wherein each of said slides is equipped with a die surface describing one-third of a circular arc.

9. In apparatus for forming an annular convolution on a tubular workpiece, the combination comprising: means for supporting such workpiece in a convolution receiving position; first and second forming means movable relative to each other axially of such workpiece, at least one of said forming means including a trio of forming die means equi-arcuately arranged about such workpiece, slide means for carrying each of said die means, said slide means being shiftable along a path substantially radially of such workpiece from a closed position wherein the die means carried by said slide means closely confronts a portion of the workpiece periphery, to an open position wherein said die means is spaced apart from such workpiece a distance greater than the height of such convolution, abutment means engageable by each said slide means in said closed position for maintaining said die means in concentricity with such workpiece, and cam means engageable with said slide means for forcefully maintaining said slide means against said abutment means.

10. In apparatus for forming an annular convolution on a tubular workpiece, the combination comprising: means for supporting such workpiece in a convolution receiving position; first and second forming means movable relative to each other axially of such workpiece, at least one of said forming means including a trio of forming die means equi-arcuately arranged about such workpiece, slide means for carrying each of said die means, said slide means being shiftable along a path substantially radially to such workpiece from a closed position wherein said die means carried by said slide means closely confronts a portion of the workpiece periphery, to an open position wherein said die means is spaced apart from such workpiece a distance greater than the height of such convolution, an annular abutment member arranged concentrically with respect to such workpiece, shoulder means on said slide means engageable in said closed position with said abutment member to insure concentricity of said die means with such workpiece, and cam means engageable with said slide means to forcefully maintain said slide means in engagement with said annular abutment member.

11. The combination defined in claim 9 and further including means for activating said cam means when said slide means are in said closed position and for de-activating said cam means when said slide means are in said open position.

12. An apparatus for forming a convolution on a workpiece including: frame means for supporting the workpiece; stop means supported by said frame means; a plurality of workpiece forming slide means supported by said frame means, each of said slide means including stop surface means, said slide means being movable radially relative to said workpiece from a closed position adjacent to the work piece to an open position spaced a distance greater than the height of a convolution from the workpiece, said stop surface means of each of said slide means being in abutting engagement with said stop means to locate said slide means relative to said work piece when said slide means is in said closed position, and said stop surface means of each of said slide means being spaced apart from said stop means when said slide means is in said open position; and drive means for moving said slide means from said open position to said closed position.

13. An apparatus as set forth in claim 12 further including: lock means supported by said frame means for maintaining said slide means in said closed position.

14. Apparatus for forming a convolution on a workpiece comprising: frame means for supporting the workpiece; and a plurality of dies which are movable from a closed position in which said dies form a continuous ring to encircle the workpiece to an open position in which said dies are spaced apart from each other and the workpiece to enable the workpiece to be moved relative to the dies, each of said dies having an arcuate workpiece forming surface which extends for an arcuate distance of less than one hundred eighty degrees.

15. Apparatus as set forth in claim 14 further including: positioning means connected to each of said dies for engagement with a stop surface means supported by said frame, said positioning means being in engagement with said stop surface means when said dies are in the closed position to locate the dies relative to the workpiece.

16. Apparatus as set forth in claim 15 further including: drive means connected to said dies to move said dies from said open position to said closed position; and latch means supported by said frame for locking said dies in said closed position with said positioning means in abutting engagement with said stop surface means.

References Cited

UNITED STATES PATENTS

| | | | |
|---|---|---|---|
| 2,581,787 | 1/1952 | Dreyer | 72—59 |
| 2,773,538 | 12/1956 | De Mers | 72—59 |
| 2,825,387 | 3/1958 | Alltop et al. | 72—59 |
| 3,083,754 | 4/1963 | De Mers | 72—59 |
| 3,105,539 | 10/1963 | Johnston | 72—59 |
| 3,130,771 | 4/1964 | Peyton | 72—59 |
| 3,247,694 | 4/1966 | Homfeldt et al. | 72—59 |

RICHARD J. HERBST, *Primary Examiner.*

A. L. HAVIS, *Assistant Examiner.*